US011656112B2

(12) United States Patent
Ramos et al.

(10) Patent No.: US 11,656,112 B2
(45) Date of Patent: May 23, 2023

(54) ACOUSTIC FLUIDS MONITORING (71) Applicant: INTERNATIONAL BUSINESS MACHINES CORPORATION, Armonk, NY (US)

(72) Inventors: Igor S. Ramos, Round Rock, TX (US); Angelo Danducci, II, Austin, TX (US); Kimberly J. Taft, Austin, TX (US); Devon E. Mensching, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 16/952,668

(22) Filed: Nov. 19, 2020

(65) Prior Publication Data

US 2022/0155120 A1 May 19, 2022

(51) Int. Cl.
*G01F 1/688* (2006.01)
*G01F 1/684* (2006.01)

(52) U.S. Cl.
CPC .......... *G01F 1/6882* (2013.01); *G01F 1/6847* (2013.01)

(58) Field of Classification Search
CPC ...... G01F 1/6882; G01F 1/6847; G01F 1/666; G01K 11/22
See application file for complete search history.

(56) References Cited

U.S. PATENT DOCUMENTS 5,360,268 A * 11/1994 Hayashi ................ G01K 11/22
374/119

9,989,423 B2 * 6/2018 Gleeson ................ G01K 11/22
10,197,456 B2 * 2/2019 Gleeson ................ G01K 11/22
(Continued)

FOREIGN PATENT DOCUMENTS

| EP | 1495291 B1 | 1/2005 |
| WO | 2014178920 A2 | 11/2014 |
| WO | 2017141002 A1 | 8/2017 |
| WO | 2019034846 A1 | 2/2019 |

OTHER PUBLICATIONS

EPA, "WaterSense, Showerheads," Jan. 18, 2013, 5 pages [online]. [retrieved on Oct. 8, 2020]. Retrieved from the Internet <URL: http://www.epa.gov/WaterSense/products/showerheads.html>.
(Continued)

*Primary Examiner* — Freddie Kirkland, III
(74) *Attorney, Agent, or Firm* — David Spalding (57) ABSTRACT A temperature state of one or more fluids in one or more enclosures is determined. Acoustic data is collected using a microphone. Frequency domain features are determined based on the acoustic data, where the frequency domain features are obtained across a frequency range of the acoustic data. The frequency domain features are correlated to the output of a machine learning acoustic analysis model and the one or more fluids are classified based on temperature based on the correlated one or more frequency domain features. In addition, the machine learning acoustic analysis model is trained by recording acoustic training data using a microphone and collecting temperature data for a fluid across a range of temperatures for the fluid. Frequency domain features are determined across a frequency range of the acoustic training data and the frequency domain features are correlated to the temperature data for a fluid.

20 Claims, 7 Drawing Sheets

(56) References Cited

U.S. PATENT DOCUMENTS

| | | | | |
|---|---|---|---|---|
| 10,208,586 | B2* | 2/2019 | Johnston | E21B 47/135 |
| 10,370,957 | B2* | 8/2019 | Jin | G01K 11/32 |
| 10,975,687 | B2* | 4/2021 | Langnes | G01N 29/11 |
| 2015/0146759 | A1* | 5/2015 | Johnston | E21B 47/07 |
| | | | | 374/117 |
| 2016/0252406 | A1* | 9/2016 | Sherrit | H03H 9/21 |
| | | | | 374/117 |
| 2016/0341606 | A1* | 11/2016 | Gleeson | G01K 11/22 |
| 2020/0174149 | A1 | 6/2020 | Thiruvenkatanathan | |

OTHER PUBLICATIONS

Horner, "Engine Knock Detection Using Spectral Analysis Techniques With A TMS320 DSP," Texas Instruments, Digital Signal Processing Products, Aug. 1995, pp. 1-62.

Mell, et al., "The NIST Definition of Cloud Computing", National Institute of Standards and Technology, U.S. Department of Commerce, Special Publication 800-145, Sep. 2011, pp. 1-7.

Miller, "What's the Best Way to Speed Up Hot Water?," Lifehacker, Jan. 18, 2013, 7 pages [online], [retrieved on Oct. 8, 2020]. Retrieved from the Internet <URL: https://lifehacker.com/whats-the-best-way-to-speed-up-hot-water-5977152>.

Mooney, "Your Shower Is Wasting Huge Amounts of Energy and Water. Here's What You Can Do About It," The Washington Post, Mar. 4, 2015, 11 pages [online], [retrieved on Oct. 8, 2020]. Retrieved from the Internet <URL: https://www.washingtonpost.com/news/energyenvironment/wp/2015/03/04/yourshoweriswastinghugeamountsofenergyandwatherheresswhattodoaboutit/?noredirect=on&utm_term=.0f0877fcd292>.

Quora, "What Algorithms Are Good Candidates For Sound Recognition?" Quora.com, 3 pages [online], [retrieved on Jul. 17, 2020]. Retrieved from the Internet <URL: https://www.quora.com/What%C2%ADalgorithms%C2%ADare%C2%ADgood%C2%ADcandidates%C2%ADfor%C2%ADsound%C2%ADrecognition%C2%ADI%C2%ADam%C2%ADprimarily%C2%AD>.

Shaikh, "Getting Started With Audio Data Analysis Using Deep Learning (with Case Study)," AnalyticsVidhya.com, Aug. 2017, pp. 1-33.

Wikipedia, "Fourier Transform," Wikipedia.com, 30 pages [online], [retrieved on Jul. 17, 2020]. Retrieved from the Internet <URL: https://en.wikipedia.org/wiki/Fourier_transform>.

* cited by examiner

ACOUSTIC FLUIDS MONITORING

BACKGROUND

Embodiments of the present invention relate generally to monitoring flow restriction and sensing the temperature of fluids, and more specifically to predicting a temperature of a fluid based on an acoustic input and frequency analysis of the received signal.

The monitoring of fluids, which may include air and other gases in addition to liquids such as water, for attributes such as flow rate or pressure or temperature is important in a variety of scenarios. In an industrial setting, large buildings have complex networks of ductwork for heating, ventilation and cooling (HVAC). Timely identification and prevention of problems via remote monitoring is critical for such systems, as small problems can turn into big and expensive problems very quickly. In a residential setting, faucets and showers may take a lot of time to get warm. It is common for people to turn on the water and walk away until it is sufficiently warm, which wastes the user's time with multiple checks on the water temperature when it is still not adequate. This process also wastes water when waiting too long after the temperature is adequate to use the shower after it is already heated up. It has been reported that this "behavioral waste" may waste as much as 20 percent of every shower and as much as 5 gallons per day per average shower user could be saved with an effective solution to this "behavioral waste". One effective solution would be to provide a simple, cost-effective way to accurately provide a user with information about the water temperature without requiring them to physically check multiple times.

SUMMARY

An embodiment is directed to a computer-implemented method for determining a temperature state of one or more fluids in one or more enclosures. The method may include collecting acoustic data using a microphone. The method may also include determining frequency domain features based on the acoustic data across a frequency range of the acoustic data. In addition, the method may include correlating the one or more frequency domain features to the output from a machine learning acoustic analysis model. The method may further include classifying the one or more fluids based on temperature based on the correlated one or more frequency domain features.

The method may also include training the machine learning acoustic model. The training may include recording acoustic training data using a microphone. The training may also include collecting temperature data for a fluid across a range of temperatures for the fluid. The training may further include determining one or more frequency domain features from the acoustic training data across a frequency range of the acoustic training data. Finally, the training may include correlating the frequency domain features to the temperature data for the fluid.

In addition to a computer-implemented method, additional embodiments are directed to a system and a computer program product for predictively deploying microservices on edge devices in a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The process of a fluid interacting with the environment, such as being poured into a cup or hitting the bathtub after being emitted from a shower, creates different sound waves at different temperatures. This acoustic phenomenon is not readily apparent for every user, and changes may be subtle, but these differences do exist and are measurable with a device that is equipped with a microphone, such as a smartphone or other devices that are commonplace today.

Other core features of a fluid pipeline that may be determined from frequency analysis of acoustic data include converting frequency data to flow rate data, which may itself be converted to pressure data, and then given the flow rate and heat capacity for a system, a rate of heat transfer may be determined.

Disclosed herein is a method for performing acoustic analysis for a room or other enclosure using a device with a microphone, e.g., a smartphone, in order to detect when a fluid temperature changes from cold to hot or vice versa, or whether it crosses a relative threshold. The method uses a supervised machine learning acoustic analysis model to determine the temperature of a fluid within bounds. The acoustic model may be trained for individual fluid sources as well as types of fluid and these training sets may be shared to a central server to improve the performance of the baseline model.

Current solutions for measuring fluid temperature usually rely on a temperature probe placed directly in the fluid or devices that must be placed directly on the heating element or flow pipe of a fluid. However, this is not always possible or cost-effective and could affect the integrity of both the conduit and the measurement. For example, when measuring flammable fluids in pipelines, where the installation and contact are a safety concern due to the potential for static energy discharge or inductive energy coupling into a metallic conductor. Another example is in instrumentation scenarios where a device under test is installed in an anechoic chamber for the purpose of electromagnetic isolation and introducing a sensor may affect the test results.

As far as cost, the only sensor required for the measurements disclosed herein is a microphone, which is embedded in many devices today and could be extended to areas such as alarm system panels, lights and air ducts in either the industrial/commercial setting or the residential setting. The microphone on a smartphone could be used to collect the necessary acoustic data for analysis by the model.

The acoustic sample can then be processed using signal processing architecture with various feature extraction techniques (e.g., spectral feature extraction techniques) to obtain one or more frequency domain features and/or combinations thereof that enable selectively extracting the acoustic signals of interest from background noise and consequently aiding in improving the accuracy of the temperature measurement. Once obtained, the frequency domain features can be used in various models in order to differentiate background noise from acoustic signals of interest, where acoustic signals of interest are sounds resulting from the interaction of the fluid within the closed environment being measured. While a number of frequency domain features can be determined for the acoustic sample data, not every frequency domain feature may be useful for determining fluid temperature. For example, there may be unwanted background noise from the environment such as interference from electronics such as mobile phones or tablets or any device that operates in a frequency band that is at or near the frequency range that is measured. There may also be electronic instrumentation noise present in the acoustic signals captured by the microphone or any other electronic sensor, which is an unwanted component that interferes with the signal. There may also be concurrent acoustic sounds in the closed environment that must be filtered out, e.g., running equipment motors or people speaking. Other possible sources of background noise are distortions in the transmission channel, thermal noise that is introduced during capturing and processing of signals by analog devices that form a part of the instrumentation, e.g., electronic amplifiers and other analog circuitry or noise that is introduced through sampling and quantization in digital systems. It will be appreciated that this should not be considered an exhaustive list of possible sources of background noise.

The frequency domain features of the acoustic signals of interest that are specific to certain fluid temperatures can be developed and signatures and/or models can be established to determine the relative temperature of a fluid, e.g., hot, warm, cold, etc. The resulting signatures or models can then be used along with real-time processed acoustic signal data to determine the relative temperature of a fluid within range of a certain sensor or if there is a change in the temperature level of the fluid. Any of the processing techniques disclosed herein can be used to initially determine a spectral signature or model(s), and then process and compare the frequency domain features in a subsequently sampled acoustic signal with the resulting spectral signatures or model(s).

Figure 1:
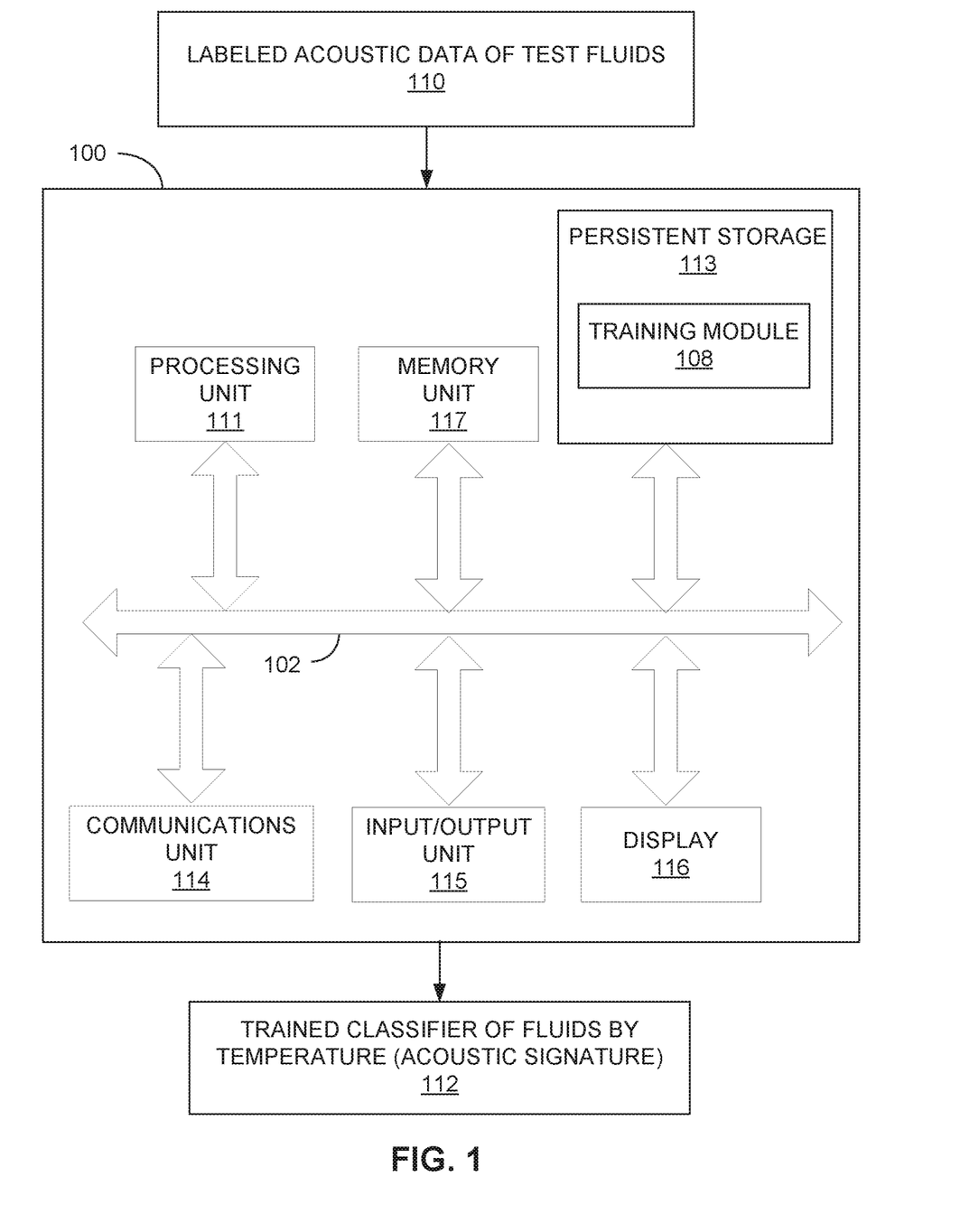
FIG. 1 is a block diagram of an example computer system for training a machine learning acoustic analysis classifier, according to an embodiment.

Referring to FIG. 1, a block diagram is shown illustrating a computer system which may be used as a client, server, or host computer according to various embodiments. As shown, a computer system 100 includes a processor unit 111, a memory unit 117, a persistent storage 113, a communications unit 114, an input/output unit 115, a display 116, and a system bus 102. Computer programs are typically stored in the persistent storage 113 until they are needed for execution, at which time the programs are brought into the memory unit 117 so that they can be directly accessed by the processor unit 111. The processor unit 111 selects a part of memory unit 117 to read and/or write by using an address that the processor 111 gives to memory 117 along with a request to read and/or write. Usually, the reading and interpretation of an encoded instruction at an address causes the processor 111 to fetch a subsequent instruction, either at a subsequent address or some other address. The processor unit 111, memory unit 117, persistent storage 113, communications unit 114, input/output unit 115, and display 116 interface with each other through the system bus 102.

The computer system 100 may be used for training a machine learning classifier (hereinafter simply "classifier"), according to an embodiment. A training module 108 may be stored in persistent storage 113. Labeled temperature data of multiple test fluids may be input to the system 100 and used to train a classifier 112 of fluids by temperature. In particular, system 100 may operate by loading instructions of training module 108 into RAM. The instructions of training module 108 may cause system 100 to receive labeled acoustic data of multiple test fluids 110, process that data, and output a trained classifier of fluids by temperature 112.

System 100 as described herein is only a sample embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system could run as one or more cloud computing "instances," "containers," and/or "virtual machines," as known in the art.

Figure 2:
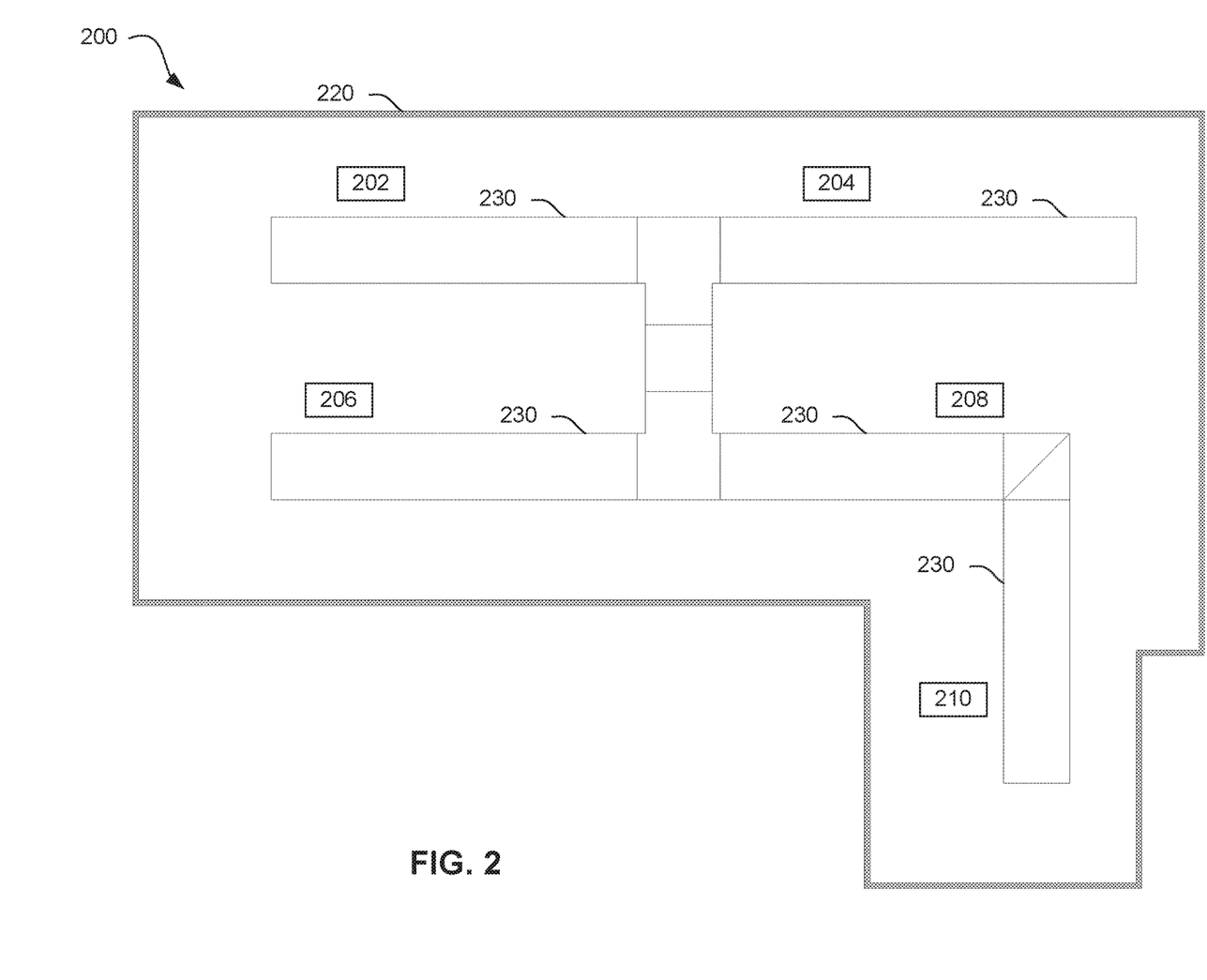
FIG. 2 shows an example closed environment in which a fluid may be monitored, and acoustic data may be collected and analyzed, according to an embodiment.

Referring now to FIG. 2, there is shown a sample closed environment 200. A building 220 may be equipped with devices having a microphone 202, 204, 206, 208 and 210, which may be placed in suitable positions throughout the building 220 near ductwork 230 to maximize the potential encounters with fluids and obtain an accurate measurement of the fluid temperature within the closed environment 200. Positioning of devices having a microphone 202, 204, 206, 208 and 210 may be determined by several factors such as the type of room, e.g., a maintenance closet or a factory floor where the temperature may need to be tightly controlled for the normal activity taking place in the room. More factors to be considered are the fluid being monitored; for example, in a residential shower setting, a device having a microphone such as 202 may be fixed near the shower to detect water temperature instead of ductwork 230 for detecting air temperature in FIG. 2. Another possible factor is safety risk, i.e., it may be dangerous to get close to a flammable liquid so the device having a microphone 202, 204, 206, 208 and 210 must be a certain distance from the fluid under test or measurement. Distance may also be dictated by the geometry of the space where the fluid is being measured. In various embodiments, a suitable distance defines a sensing range of the microphone and the microphone is placed within the sensing range of an enclosure. If a particular enclosure has a sensitivity or sensing range of 5 feet, the microphone may be placed anywhere within 5 feet of the enclosure. It is not required that the microphone be attached to an enclosure or placed within the enclosed fluid. The microphone may be spaced apart from the enclosure or fluid. In addition to fixed positions, it may be appreciated by one skilled in the art that devices may include smartphones so there may not be fixed locations for the devices having a microphone 202, 204, 206, 208 and 210. In addition, simple microphones may be embedded in walls or other common devices seen in commercial buildings and homes such as light switch panels or thermostats or security panels.

Different areas within the enclosure may have specific characteristics that cannot be captured with a single microphone within the enclosure 220. Also, there may be different characteristics of the fluids within the enclosure 220 that require multiple microphones in the same or different locations. In an embodiment, an enclosure 220 may be an entire building or room(s) within a building. Also, ductwork 230 is shown but in other embodiments, ductwork 230 may be a pipe or other conduit suitable for the fluid being transported. It will also be appreciated that the measurement may be taken within the vessel carrying the fluid rather than nearby, as shown in FIG. 2. The details of how these components are used is described in further detail below. It should be noted that for simplicity, only one contiguous area is shown in FIG. 2; in practice, there may be multiple areas such as the one shown in FIG. 2 in a larger structure and there may be more devices placed in many different locations at this stage. For simplicity, only a selection of the devices and enclosures are shown.

Figure 3:
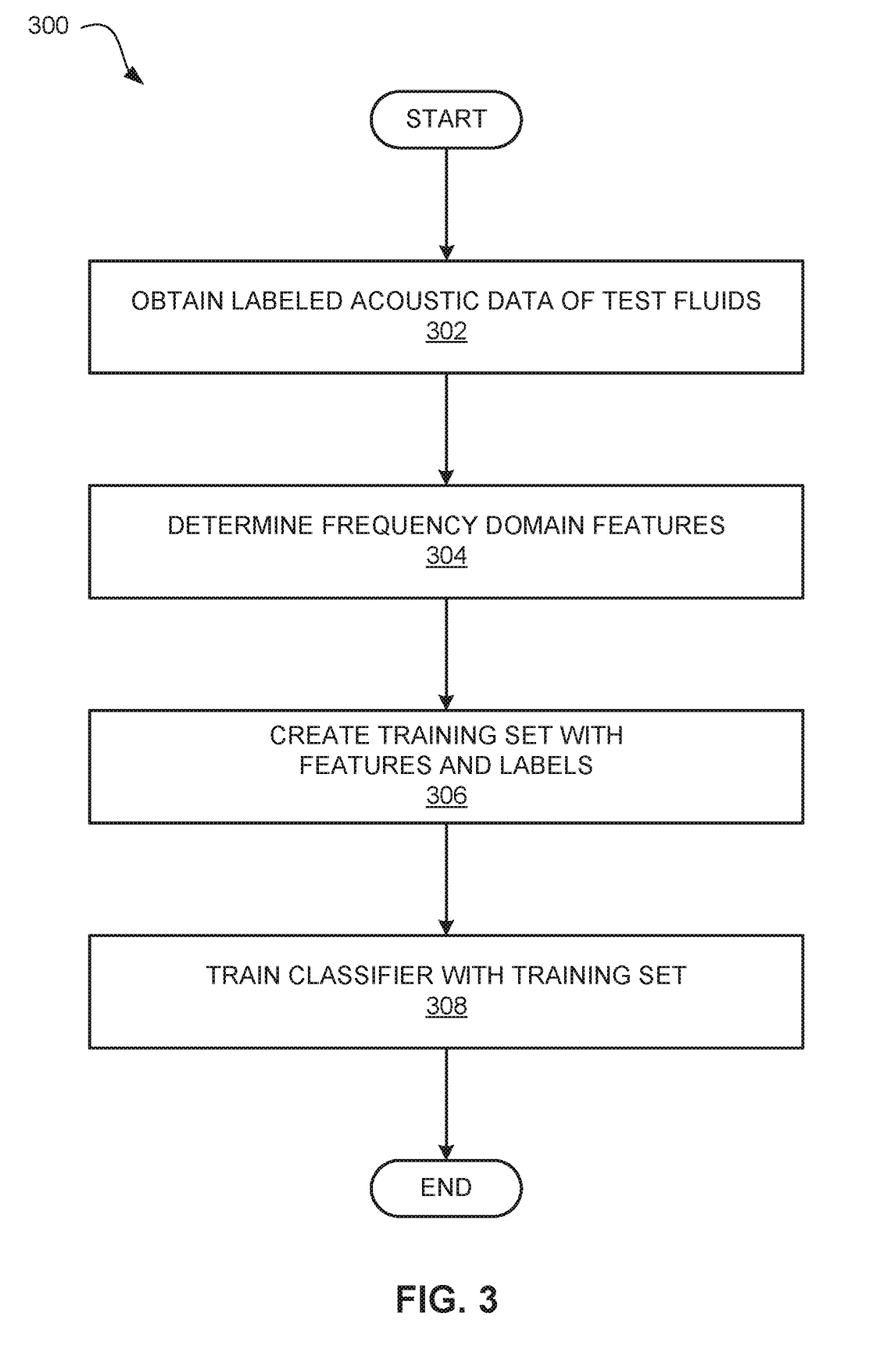
FIG. 3 is a flowchart of a method for training a machine learning acoustic analysis model, according to an embodiment.

Referring now to FIG. 3, a flowchart of a method for training a classifier of fluids by temperature 300, in accordance with an embodiment, is illustrated. Computer system 100, and specifically the instructions of training module 108, performs the steps of the method of FIG. 3 automatically unless specifically stated otherwise.

Labeled acoustic data of test fluids 110 (from FIG. 1) is obtained at step 302. Acoustic data may be collected from the enclosure by one or more microphones and, at the same time, information about the temperature of a test fluid may be collected to label the acoustic data for use in the training process. The example environment 200 shown in FIG. 2 may be used as an example of this process. The devices 202, 204, 206, 208 and 210 record the received acoustic signal at these locations with an appropriate application. A test fluid is started if not already flowing, e.g., the HVAC system is turned on so air can flow through the ductwork 230, and the temperature of the fluid is recorded using an appropriate measuring device, e.g., one or more conventional temperature sensors. It should also be noted that it is possible to determine the temperature of multiple isolated or semi-isolated fluids from a single microphone. Therefore, a single device having a microphone, e.g., 202, may be used to collect data for air through the ductwork 230 but also water through a nearby pipe or any fluid through an appropriate nearby conduit, even though only the ductwork 230 is pictured here. The recorded temperature is used for labeling the data for the fluid and to define the classifications that may be used by the machine learning acoustic analysis model, e.g., hot, warm, cold, etc. In the training stage, the temperature of the fluid may be varied across the entire possible range of temperatures that may be encountered in the controlled environment and sound recordings may be taken at each point throughout the temperature range to provide a plurality of test fluid measurements across the temperature range as sufficient training data for the machine learning acoustic analysis model.

At step 304, the acoustic analysis model training module 108 may receive as input the labeled fluid acoustic data 110 associated with the plurality of test fluid measurements taken in step 302. The acoustic analysis model training module 108 may separate the acoustic signals of interest, e.g, specific frequency bands, from background noise through appropriate filters and may generate a set of frequency domain features for each test fluid measurement in the labeled acoustic data 110. In an embodiment, the acoustic analysis model training module 108 may be configured to transform the filtered data from the time domain into the frequency domain using known algorithms. A Fast Fourier Transform (FFT), including for example, a Discrete Fourier Transformation (DFT) or a Short Time Fourier Transformation (STFT), of the acoustic variant time domain data measured for each temperature may be performed to provide the data from which the plurality of frequency domain features may be determined. The resulting data sample may then be represented by a range of frequencies relative to the power levels at which they are present. In general, the acoustic sample will be in the frequency domain in order to determine the frequency domain feature(s). Within this process, various frequency domain features can be calculated for the acoustic sample data. Extracting these spectral features may determine if an acoustic signature is present in the acoustic sample. The machine learning acoustic analysis model training module 108 may analyze the acoustic sample data in the frequency domain to obtain one or more of the frequency domain features and provide an output with the determined frequency domain features for use in training the machine learning acoustic analysis model, which may be a multi-vector/multi-target regression model correlating frequency domain features to fluid temperature. For example, increases or decreases in activity in specific frequency bands may indicate the temperature classification of the test fluid. While pre-determined frequency bands may be analyzed for this purpose, the machine learning acoustic analysis module 108 may look across any part of the electromagnetic spectrum once the noise has been filtered out for activity in any frequency range that may be unique to that test fluid or specific temperature. Frequency domain features for one classification need not be in the same frequency band as the features for another classification.

At step 306, the frequency domain features determined in step 304 are correlated with the labels connected to the labeled acoustic data of test fluids 110 and the combined data becomes a training set for the machine learning acoustic analysis model. Any representation of the training set is possible so long as it includes the computed frequency domain features and the temperature labels. In addition to the data gathered in this training phase that is specific to the controlled environment being monitored, default or pre-recorded data may be used at this stage to augment the data and assist in training the machine learning acoustic analysis model.

At step 308, a classifier is trained based on the training set created in step 306. The classifier may be, for example, logistic regression, naive Bayes, a nearest neighbor classifier, a Support Vector Machine (SVM) classifier, a decision tree classifier, a boosted tree classifier, a random forest classifier, a neural network classifier, or any other type of machine learning classifier. The training of the classifier may be conducted using any conventional method suitable for that type of classifier. Following the training, a trained classifier of fluids by temperature 112 is provided, which is configured, when applied to a monitored fluid, to infer a classification of that fluid as one of many classifications such as hot, warm, cold, etc. The machine learning acoustic analysis model may determine the parameters of each classification by setting a minimum or maximum temperature (or both) or these parameters may be manually configured with or without preset values. The trained classifier of fluids by temperature 112 may also be used as an acoustic signature or "fingerprint" for a fluid that is being monitored in the controlled environment.

Figure 4:
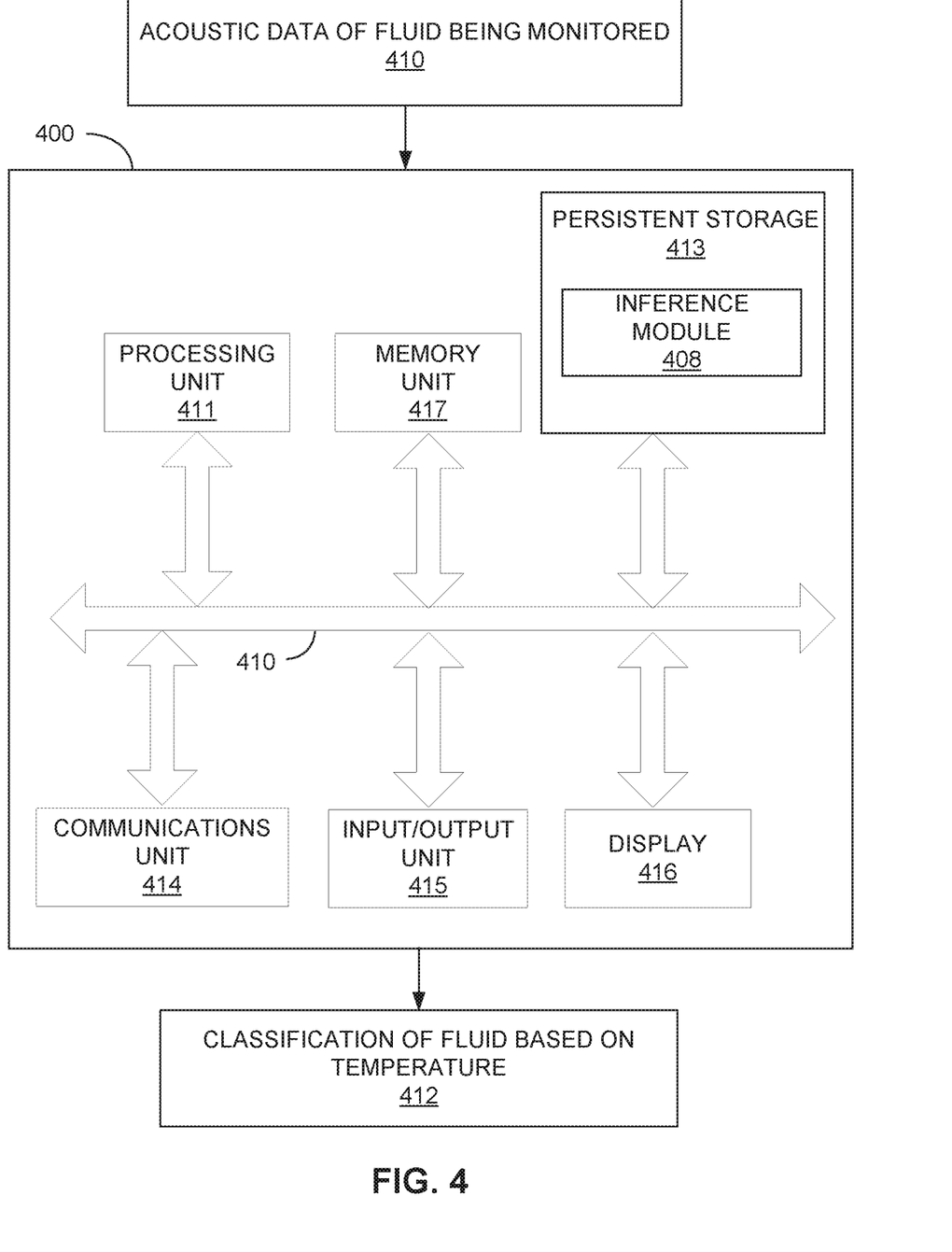
FIG. 4 is a block diagram of an example computer system for classifying monitored fluids according to temperature, according to an embodiment.

Reference is now made to FIG. 4, which shows a block diagram of a computer system 400 for classifying monitored fluids according to temperature, according to an embodiment. The computer system 400 may be used as a client, server, or host computer according to various embodiments. As shown, a computer system 400 includes a processor unit 411, a memory unit 417, a persistent storage 413, a communications unit 414, an input/output unit 415, a display 416, and a system bus 410. Computer programs are typically stored in the persistent storage 413 until they are needed for execution, at which time the programs are brought into the memory unit 417 so that they can be directly accessed by the processor unit 411. The processor unit 411 selects a part of memory unit 417 to read and/or write by using an address that the processor 411 gives to memory 417 along with a request to read and/or write. Usually, the reading and interpretation of an encoded instruction at an address causes the processor 411 to fetch a subsequent instruction, either at a subsequent address or some other address. The processor unit 411, memory unit 417, persistent storage 413, communications unit 414, input/output unit 415, and display 416 interface with each other through the system bus 410. Computer system 400 includes an inference module 408 instead of a training module. The instructions of inference module 408 may cause system 400 to receive acoustic data of a fluid under monitoring 410, process that data, and infer a classification 412 of the fluid according to temperature.

Figure 5:
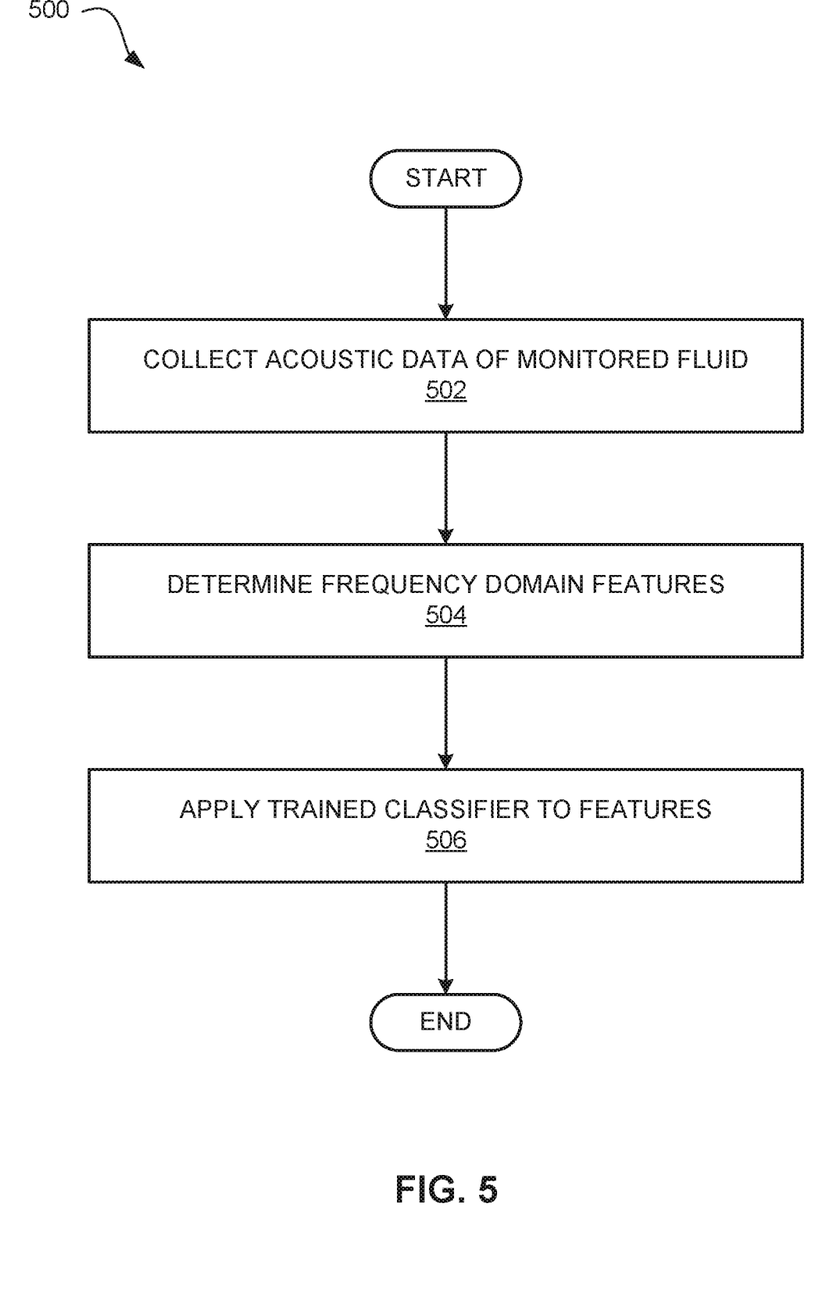
FIG. 5 is a flowchart of a method for classifying a fluid being monitored according to temperature, according to an embodiment.

Referring now to FIG. 5, a flowchart of a method for classifying a fluid being monitored according to temperature 500, in accordance with an embodiment, is illustrated. Computer system 400, and specifically the instructions of inference module 408, performs the steps of the method of FIG. 5 automatically unless specifically stated otherwise.

At step 502, acoustic data of a fluid being monitored 410 (of FIG. 4) is obtained, for example in the same manner described above for obtaining the labeled acoustic data for the training. Referring again to the example of FIG. 2, devices equipped with a microphone 202, 204, 206, 208 and 210 may be placed in the same or similar locations as the training phase of the controlled environment being monitored but it should be noted that these may not necessarily be the same exact locations. In this running phase, the acoustic signal may be monitored in real time to provide continuously updated acoustic data of the fluid to the machine learning acoustic analysis model.

At step 504, the acoustic analysis model inference module 308 receives as input the acoustic data of a fluid being monitored 410 and generates a set of frequency domain features in the same manner as step 304 above in the training phase. In an embodiment, the inference module 408 may be configured to transform the filtered data from the time domain into the frequency domain using known algorithms. A Fast Fourier Transform (FFT), including for example, a Discrete Fourier Transformation (DFT) or a Short Time Fourier Transformation (STFT), of the acoustic variant time domain data measured for each temperature may be performed to provide the data from which the plurality of frequency domain features may be determined. The resulting data sample may then be represented by a range of frequencies relative to the power levels at which they are present, just as in step 304. The machine learning acoustic analysis model inference module 408 may analyze the acoustic sample data in the frequency domain to obtain one or more of the frequency domain features and provide an output with the determined frequency domain features for use in classifying the fluid being monitored according to temperature.

In step 506, the trained classifier of fluids by temperature 112 may be applied to the frequency domain features that are calculated in step 504 in order to infer a classification of the monitored fluid according to temperature. This step may also trigger further action based on the state of the monitored fluid. For instance, if the fluid is classified as hot within a certain period of time after being determined to be cold, there may need to be remedial action taken by a manual or automated control system. For example, this remedial action may include closing valves to cut off flow to or from a suspected problem area. At the same time, an alert may be communicated via SMS, push notification, alert tone, a smart home device located in another room or other method to warn of a dangerous condition or to inform the appropriate personnel that a pipe or other conduit, or the enclosure itself, is worn or damaged based on the temperature classification. Once action has been taken or not and any situation triggered by the fluid classification has been analyzed and a user has evaluated the results, that user may confirm if the detection was correct or not and provide feedback to the training module 108. This feedback would be used as training data for the classifier in order to improve the machine learning acoustic analysis model. For instance, in a residential application such as monitoring the temperature of a shower, if the classifier triggers an alert to the resident that the shower is at the correct temperature, they may check the water themselves and confirm the result. That confirmation can be used to refine the classification.

To allow for prompt action by a control system, it may be beneficial to execute the method of FIG. 5 in real-time, for every monitored fluid in the controlled environment (or perhaps for certain fluids flagged as high importance by some other preliminary algorithm). The inference module 408 may periodically update its temperature data 410, i.e., every predetermined number of seconds, run the frequency domain transform if necessary and compute the relevant frequency domain features. After each update, the classifier may be applied to the newly computed features and alerts may be transmitted to appropriate personnel.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
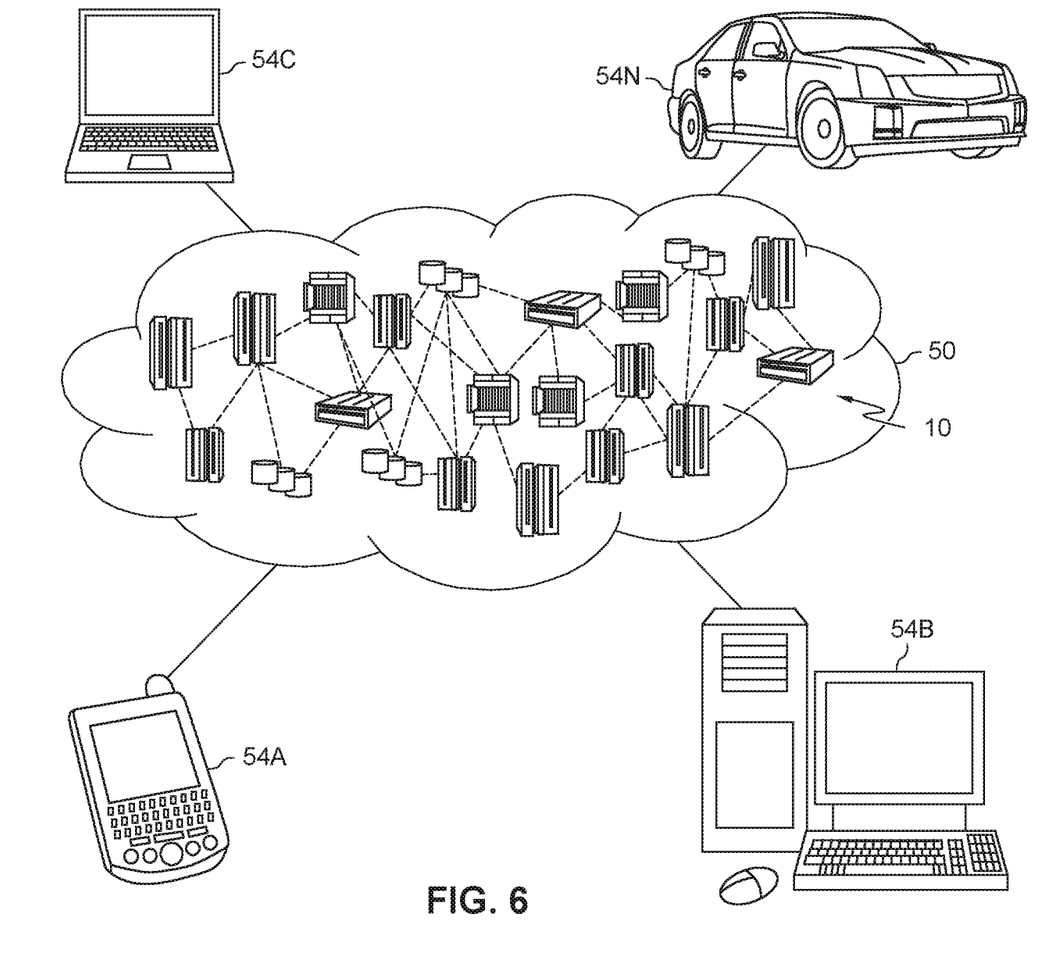
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
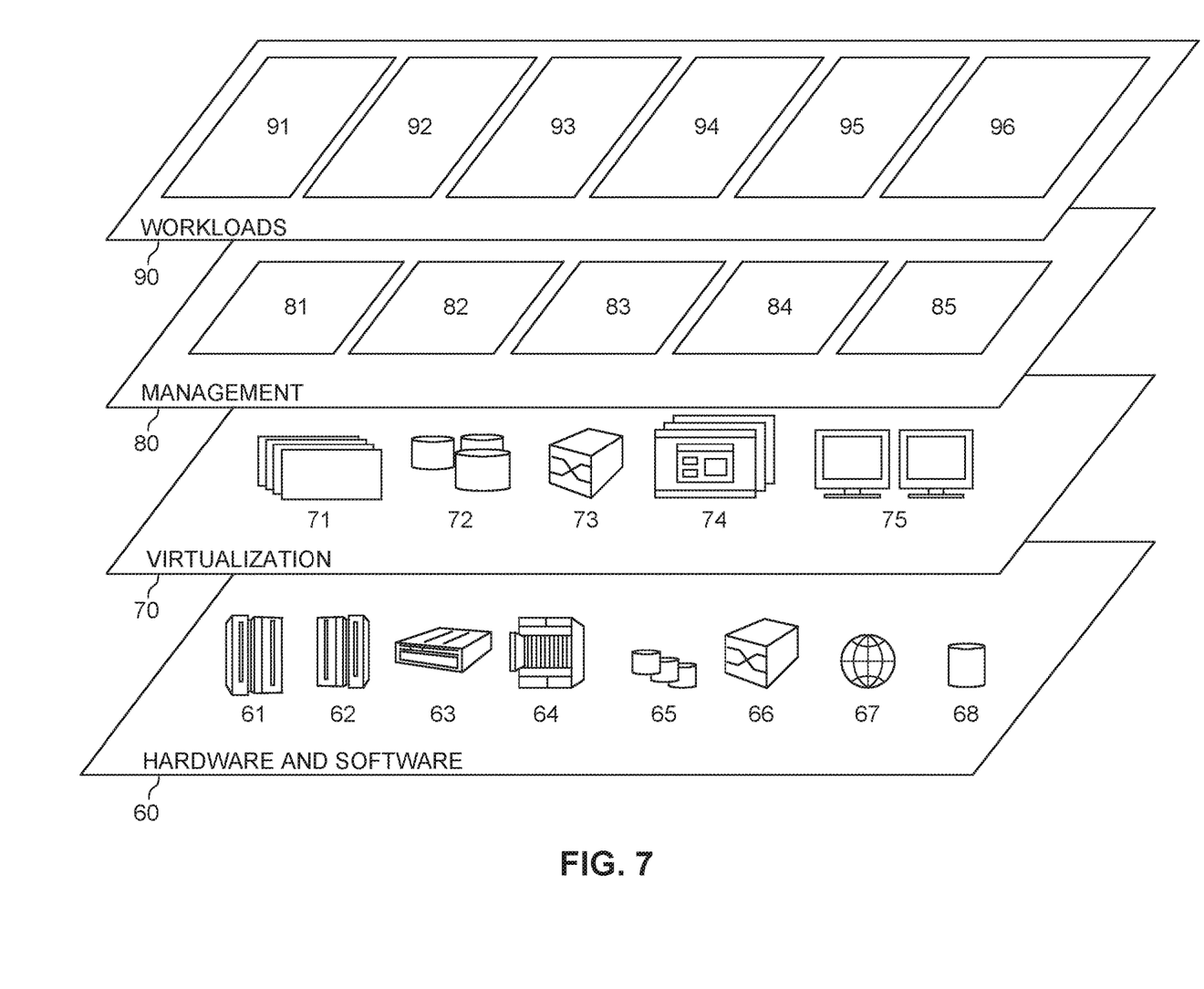
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96 such as the training module 108 or inference module 408.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a temperature state of one or more fluids in one or more enclosures comprising:
   collecting acoustic data using a microphone;
   identifying one or more frequency domain features in the acoustic data, wherein the one or more frequency domain features are obtained across a frequency range of the acoustic data;
   generating a spectral signature using a machine learning acoustic analysis model, wherein the spectral signature is associated with the temperature state of the one or more fluids;
   comparing the one or more frequency domain features to the spectral signature; and
   classifying the one or more fluids the temperature state when the spectral signature is correlated to the one or more frequency domain features.

2. The computer-implemented method of claim 1, wherein generating the spectral signature further comprises:
   recording acoustic training data using the microphone;
   collecting temperature data for a fluid, wherein the temperature data is obtained across a range of temperatures for the fluid;
   identifying the one or more frequency domain features in the acoustic training data, wherein the one or more frequency domain features are obtained across a frequency range of the acoustic training data; and
   generating the spectral signature by correlating the one or more frequency domain features to the temperature data for the fluid.

3. The computer-implemented method of claim 2, further comprising:
   determining parameters for the spectral signature from the correlating the one or more frequency domain features to the temperature data for the fluid.

4. The computer-implemented method of claim 1, further comprising:
   triggering one or more remedial actions based on the classifying the one or more fluids based on the temperature state.

5. The computer-implemented method of claim 1, wherein the microphone simultaneously records the acoustic data from a plurality of fluids in a plurality of enclosures.

6. The computer-implemented method of claim 1, wherein the microphone is within a sensing range of the one or more enclosures.

7. The computer-implemented method of claim 1, further comprising calculating one or more of a flow rate, a pressure and a heat transfer rate for the one or more fluids in the one or more enclosures based on the one or more frequency domain features.

8. The computer-implemented method of claim 1, wherein a regression model having multiple vectors and multiple targets is used to generate the spectral signature.

9. A computer program product for determining a temperature state of one or more fluids in one or more enclosures, the computer program product comprising:
   a computer-readable storage device having program instructions embodied therewith, the program instructions executable by a processor to cause the processor to perform a method comprising:
   collecting acoustic data using a microphone;
   identifying one or more frequency domain features in the acoustic data, wherein the one or more frequency domain features are obtained across a frequency range of the acoustic data;
   generating a spectral signature using a machine learning acoustic analysis model, wherein the spectral signature is associated with the temperature state of the one or more fluids;
   comparing the one or more frequency domain features to the spectral signature; and
   classifying the one or more fluids the temperature state when the spectral signature is correlated to the one or more frequency domain features.

10. The computer program product of claim 9, wherein generating the spectral signature further comprises:
    recording acoustic training data using the microphone;
    collecting temperature data for a fluid, wherein the temperature data is obtained across a range of temperatures for the fluid;
    identifying the one or more frequency domain features in the acoustic training data, wherein the one or more frequency domain features are obtained across a frequency range of the acoustic training data; and
    generating the spectral signature by correlating the one or more frequency domain features to the temperature data for the fluid.

11. The computer program product of claim 10, further comprising:
    determining parameters for the spectral signature from the correlating the one or more frequency domain features to the temperature data for the fluid.

12. The computer program product of claim 9, further comprising:
    triggering one or more remedial actions based on the classifying the one or more fluids based on the temperature state.

13. The computer program product of claim 9, wherein the microphone simultaneously records the acoustic data from a plurality of fluids in a plurality of enclosures.

14. The computer program product of claim 9, further comprising calculating one or more of a flow rate, a pressure and a heat transfer rate for the one or more fluids in the one or more enclosures based on the one or more frequency domain features.

15. A computer system for determining a temperature state of one or more fluids in one or more enclosures, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

collecting acoustic data using a microphone;

identifying one or more frequency domain features in the acoustic data, wherein the one or more frequency domain features are obtained across a frequency range of the acoustic data;

generating a spectral signature using a machine learning acoustic analysis model, wherein the spectral signature is associated with the temperature state of the one or more fluids;

comparing the one or more frequency domain features to the spectral signature; and classifying the one or more fluids the temperature state when the spectral signature is correlated to the one or more frequency domain features.

16. The computer system of claim 15, wherein generating the spectral signature further comprises:

recording acoustic training data using the microphone;

collecting temperature data for a fluid, wherein the temperature data is obtained across a range of temperatures for the fluid;

identifying the one or more frequency domain features in the acoustic training data, wherein the one or more frequency domain features are obtained across a frequency range of the acoustic training data; and generating the spectral signature by correlating the one or more frequency domain features to the temperature data for the fluid.

17. The computer system of claim 16, further comprising:

determining parameters for the spectral signature from the correlating the one or more frequency domain features to the temperature data for the fluid.

18. The computer system of claim 15, further comprising:

triggering one or more remedial actions based on the classifying the one or more fluids based on the temperature state.

19. The computer system of claim 15, wherein the microphone simultaneously records the acoustic data from a plurality of fluids in a plurality of enclosures.

20. The computer system of claim 15, further comprising calculating one or more of a flow rate, a pressure and a heat transfer rate for the one or more fluids in the one or more enclosures based on the one or more frequency domain features.

* * * * *